Aug. 15, 1967      W. H. VORIS      3,336,349
ALKANOYL ESTERS OF THE TRIHYDROXY BENZENES
Filed Sept. 17, 1964
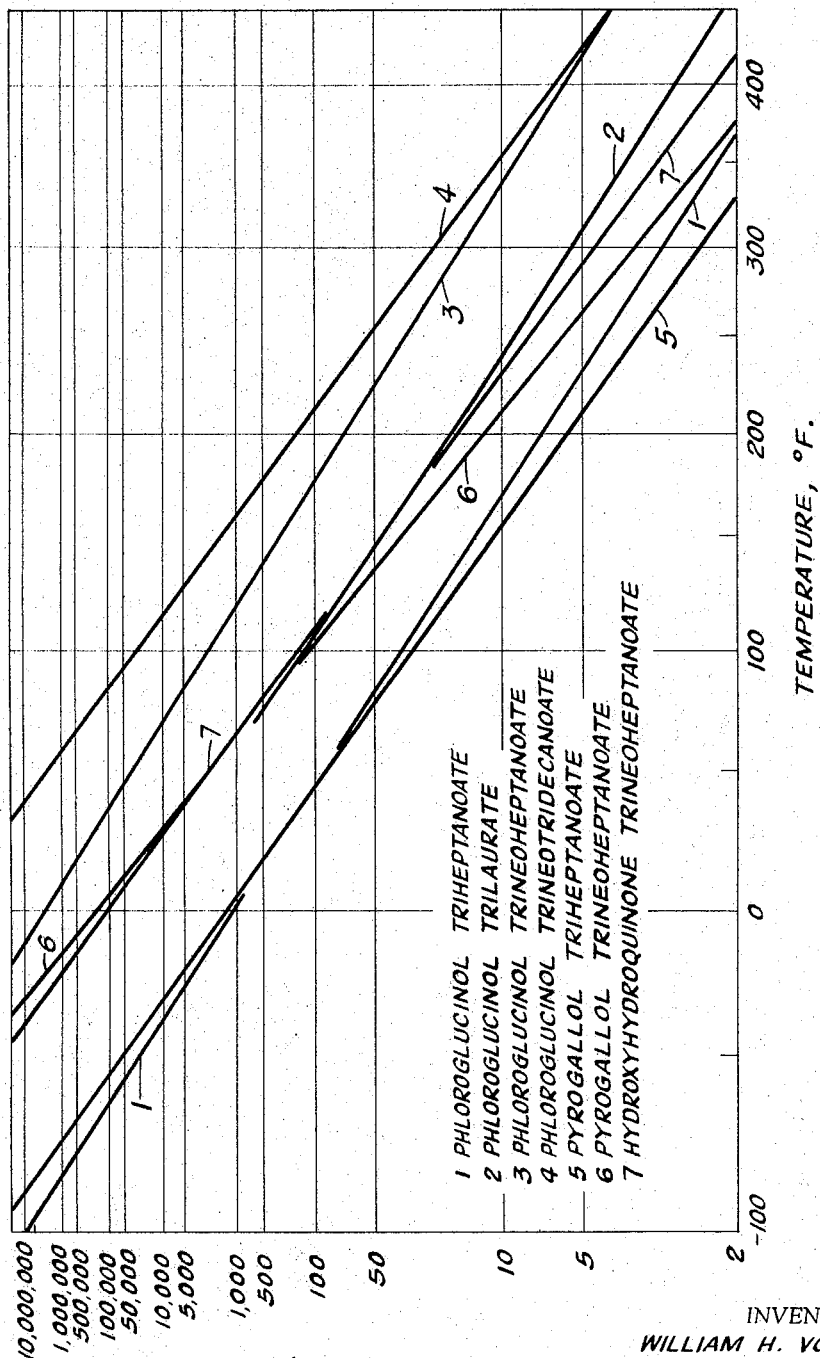
INVENTOR.
WILLIAM H. VORIS

United States Patent Office 3,336,349
Patented Aug. 15, 1967

3,336,349
ALKANOYL ESTERS OF THE TRIHYDROXY BENZENES
William H. Voris, Mars, Pa., assignor to Koppers Company, Inc., a corporation of Delaware
Filed Sept. 17, 1964, Ser. No. 397,154
13 Claims. (Cl. 260—410.5)

ABSTRACT OF THE DISCLOSURE

Synthetic lubricants are provided which have exceptionally wide viscosity ranges, unusually good viscosity-temperature relationships and a high degree of thermal and oxidative stability. The synthetic lubricants consist of alkanoyl esters of the trihydroxy benzenes. The lubricants are especially useful for modern jet engines.

---

This invention relates generally to synthetic lubricants and more particularly to the use of the alkanoyl esters of trihydric phenols.

Petroleum based lubricants have worked well for piston-type engines. Modern jet engines demand the lubricants to withstand such severe conditions of temperature, oxidation, load pressure, and radiation exposure that the petroleum lubricants cannot meet the requirements. Attempts are being made, therefore, to develop synthetic lubricants that will qualify.

It has now been found that the alkanoyl esters of trihydroxy benzene provide superior lubricants. Such esters have exceptionally wide viscosity ranges, unusually good viscosity-temperature relationships, and a high degree of thermal and oxidative stability.

The trihydroxy benzenes, pyrogallol (1,2,3-trihydroxy benzene), phloroglucinol (1,3,5-trihydroxy benzene), and hydroxy hydroquinone (1,2,4-trihydroxy benzene), are well known for specialty uses. Pyrogallol (1,2,3-trihydroxy benzene), for example, is an important photographic developer. Phloroglucinol (1,3,5-trihydroxy benzene) is a useful reagent for analytical purposes, for example, for the estimation of furfural.

The preferred esters usable in accordance with this invention are those formed from the trihydroxy benzene and alkanoyl radicals having from six to twenty carbon atoms. It is possible, however, to use as a lubricant those esters wherein two of the three acyl groups contain from two to twenty carbon atoms. It is preferred to use the neo acids for the esterification because the neo acid (2,2-dialkylacyl) esters of the trihydric phenols have good stability against oxidation and thermal decomposition. This characteristic is believed to be due to the absence of tertiary hydrogen atom on the carbon atom alpha to the carboxyl group of the neo acid structure. The esters can be represented as

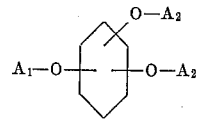

where $A_1$ is an acyl group containing 6–20 carbon atoms and $A_2$ is an acyl group containing 2–20 carbon atoms.

The esterification can be conveniently carried out by reacting the trihydroxy benzene with any alkanoyl chloride.

The invention will be illustrated further by the following examples:

EXAMPLE I

There was added 16 grams of dehydrated phloroglucinol (0.127 mole), 150 milliliters of toluene, and 2 milliliters of dimethylformamide to a 500 milliliter flask equipped with a Dean-Stark trap.

The mixture was heated to 90° C. and n-heptanoyl chloride (62.5 g., 0.42 mole) (10% excess) then added through a dropping funnel over a period of about thirty minutes while the temperature was maintained between 102–110° C. Hydrogen chloride evolved vigorously from the reaction mixture as the orange solids went into solution. Heating of the reaction to a temperature of 103–106° C. was continued for six hours during which time the HCl evolution finally ceased. The mass was cooled to about room temperature and pyridine (20 ml.) was then added. The mass was again heated to 100° C. and there maintained for another two hours.

The crude product was washed successively with dilute hydrochloric acid, then with dilute caustic, and thereafter with water until the final wash was neutral.

The toluene was removed from the reaction mass by vacuum distillation and the residue, a clear red liquid, 49 g. or 83.5% of theory remained.

Distilling the product to a residue temperature of 230° C. at the subatmospheric pressure of 0.5 mm. H yielded only 0.3 g. colorless distillate while the color of the product reside turned from red to dark brown. The product contained no free hydroxyls (I.R.) showed a trace amount of a carbonyl impurity (by I.R.), gave an acid No. of 0.1 mg. KOH/g. and a saponification No. of 455 mg. KOH/g. (theory=728), the saponification No. showing less than 63% decomposition.

The general characteristics are illustrated also in the attached drawing. The compounds listed on the drawing were also prepared following the above general procedure. The general characteristics of these compounds are also illustrated in Table 1.

TABLE 1

| Ester | Viscosity, cst. | | | ASTM Slope | Viscosity Index | 13,000 cst. T, °F. | 500,000 cst. T, °F. | Pour Point, °F. | Thermal Stability Tests, TGA (in air) °F. | |
|---|---|---|---|---|---|---|---|---|---|---|
| | 100° F. | 210° F. | 275° F. | | | | | | T 10% | T 10% |
| Phloroglucinol Triheptanoate | 35 | 6.4 | | 0.66 | 139 | −40 | −79 | −53 | 549 | 620 |
| Pyrogallol Triheptanoate | 29 | 5.1 | | 0.73 | 116 | −35 | −70 | −4 | 518 | 586 |
| Phloroglucinol Trineoheptanoate | 2,210 | 71 | | 0.64 | 89 | +66 | +15 | +32 | 545 | 662 |
| Pyrogallol Trineoheptanoate | 138 | 10 | | 0.80 | 34 | +17 | −18 | 0 | 464 | 532 |
| Hydroxyhydroquinone Trineoheptanoate | 205 | 14 | | 0.74 | 60 | +23 | −17 | 0 | 505 | 568 |
| Phloroglucinol Trilaurate | 186 | 15 | 7 | 0.70 | 86 | (¹) | | | 572 | 715 |
| Phloroglucinol Trineotridecanoate | 28,000 | 163 | 35 | 0.76 | (²) | +112 | +65 | | 572 | 700 |

¹ Sets up as a grease at room temperature.  ² Viscosity level above range used for V.I. calculation.

EXAMPLE II

*Pyrogallol acetate-hexanoate-neoheptanoate*

Pyrogallol (126 g., 1.0 mole) and toluene (1500 ml.) were charged to a flask equipped with a Dean-Stark trap, reflux condenser, thermometer, and stirrer. The mixture was stirred and heated to reflux. A small amount of water was removed by azeotroping distillation by draining of the Dean-Stark trap until 100 ml. toluene had been removed and the trap contents were no longer cloudy. The mixture was cooled to 70° C. Then acetyl chloride (78.5 g., 1.0 mole) was added over a period of 20 minutes while the reaction mass was being stirred and maintained at a temperature of 70–90° C. The heating of the mass was continued for about 2 hours until no more hydrogen chloride evolution was observed and the mixture was refluxing at about 110° C. The mixture was cooled to 70° C. Then, n-hexanoyl (caproyl) chloride (135 g., 1.0 mole) was added over a period of 20 minutes while the reaction mass was stirred and maintained at a temperature of 80–90° C. Thereafter heating was continued for about 2 hours until there was no more evidence of hydrogen chloride evolution and the mixture was refluxing at 110° C. The reaction mass was again cooled to 70° C. and neoheptanoyl chloride (164 g., 1.1 mole) added over a period of 20 minutes while stirring the reaction mass and maintaining the temperature of their reaction mass at 85–90° C. Thereafter heating was continued for about 2 hours until there was little evidence of hydrogen chloride evolution and the solution was refluxing at about 110° C. After cooling the reaction mass to 40° C., pyridine (80 ml.) was added. Again the mixture was then heated to 110° C. and maintained at this temperature for 2 hours to assure completeness of the esterification. The reaction mass was then cooled, washed successively with a dilute solution of hydrochloric acid, a dilute solution of sodium hydroxide, and finally with distilled water until the wash water was neutral to pH indicator paper. Toluene was removed from the reaction mass by distillation. Then the distillation was continued under vacuum until the temperature of the residue reached 200° C. at the subatmospheric pressure 0.5–1.0 mm. Hg. Only a few milliliters of distillate was collected. The monoacetate-monohexanoate-mononeoheptanoate of pyrogallol obtained as the residue (340 g., 90% yield) was an amber colored oil containing no free hydroxyls (by infrared analysis), and had an acid No. of 0.2 mg. KOH per gram. Other characteristics were:

| | | |
|---|---|---|
| Viscosity at 100° F. | cs | 99 |
| Viscosity at 210° F. | cs | 9.45 |
| ASTM slope | | 0.76 |
| Pour point | °F | −30 |
| 13,000 cs. temp. | °F | +5 |

EXAMPLE III

Hydroxyhydroquinone (126 grams 1.0 mole) and toluene (1500 milliliters) were charged to a flask equipped with a Dean-Stark trap, reflux condenser, thermometer, and stirrer. To dehydrate the material, the mixture was stirred and heated to reflux and any water was removed by azeotropic distillation by draining the Dean-Stark trap until 100 milliliters toluene had been removed and the trap contents were clear. The mixture was cooled to 70° C. and neotridecanoyl chloride (232 grams, 1.0 mole) was added over a period of twenty minutes while the reaction mass was being stirred and maintained at a temperature of 70–90° C. Heating of the mass was continued for about two hours until no more hydrogen chloride evolution was observed and the mixture was refluxed at about 110° C. The mixture was cooled to 70° C. then eicosanoyl chloride (331 grams, 1.0 mole) was added over a period of thirty minutes while the reaction mass was being stirred and maintained at a temperature of 80–90° C. Thereafter, heating was continued again for about two hours until there was no more evidence of hydrogen chloride evolution and the mixture was refluxing at about 110° C. The reaction mass was again cooled to 70° C. and acetyl chloride (86.4 grams, 1.1 mole) was added over a period of 20 minutes while stirring the reaction mass and maintaining the temperature of the of the reaction mass at 85–90° C. Heating was continued for about two hours until no further evolution of hydrogen chloride was observed and the solution was refluxing at about 110° C. After cooling the reaction mass to 40° C. pyridine (80 milliliters) was added. Again the mixture was heated to reflux at about 110° C. and maintained at this temperature for two hours to assure completeness of esterification. The reaction mass was then cooled, and washed successively with dilute hydrochloride solution, with dilute sodium hydroxide solution, and finally with distilled water until the wash water was neutral to pH indicator paper. Toluene was removed from the reaction mass by distillation. Then the distillation was continued under vacuum until the residue reached a temperature of 200° C. at the subatmospheric pressure of 0.5–1.0 millimeters of mercury.

The acetate-eicosanoate-neotridecanoate of hydroxyhydroquinone which remained as the residue (460 g., 70% yield) was a dark colored oil containing no free hydroxyl groups (by infrared analysis) and had an acid No. of 1.0 mg. KOH/g. It also had:

| | | |
|---|---|---|
| Viscosity at 100° F. | cs | 30,000 |
| Viscosity at 210° F. | cs | 175 |
| ASTM slope | cs | 0.76 |
| Pour Point | °F | 70 |

EXAMPLE IV

The general procedure of Example III was repeated except that (a) 1 mole of phloroglucinol was substituted for a mole of hydroxyhydroquinone, (b) lauroyl chloride (219 grams, 1.0 mol) was substituted for the neotridecanoyl chloride and (c) n-butanoyl chloride (107 grams, 1.0 mole) was substituted for the eicosanoyl chloride of Example III.

The acetate-butyrate-laurate of phloroglucinol obtained as the residue (337 grams, 80%) was a straw colored oil containing no free hydroxyl groups (by I.R.) and had an acid No. of 0.4 mg. KOH/g. It also had:

| | | |
|---|---|---|
| Viscosity at 100° F. | cs | 30 |
| Viscosity at 210° F. | cs | 5.74 |
| ASTM slope | | 0.68 |
| Pour point | °F | −75 |
| 13,000 cs. temp. | °F | −45 |

EXAMPLE V

Phloroglucinol (126 grams, 1.0 mole) and toluene (1500 milliliters) were charged to a flask equipped with a Dean-Stark trap, reflux condenser, thermometer and stirrer. The material was dehydrated by heating the mixture to reflux so that any water was removed by azeotropic distillation by draining the Dean-Stark trap until 100 milliliters toluene had been removed and the trap contents were clear. The mixture was cooled to 70° C. A mixture consisting of lauroyl chloride (219 grams, 1.0 mole), n-butanoyl chloride (107 grams, 1.0 mole) and acetyl chloride (86.4 grams, 1.1 mole) was added over a period of ninety minutes while the reaction mass was stirred and maintained at a temperature of 70–90° C. Heating was continued for six hours until no more hydrogen chloride evolution was observed and the solution was refluxing at 110° C. The solution was cooled to 40° C. and pyridine (80 ml.) was added. Heating was resumed and the temperature of the reaction mass was maintained at reflux at about 110° C. for about two hours. The reaction mass was cooled, washed successively with a dilute solution of hydrochloric acid, a dilute solution of sodium hydroxide and finally with distilled water until the wash water was neutral to pH indicator paper. Toluene was removed from the mass by distillation and the distillation was continued under vacuum until the residue reached temperature of 200° C. at the subatmosphere pressure of .5–1.0 mm. of mercury.

The acetate-butyrate-laurate product of phloroglucinol obtained as the residue (379 grams, 90% yield) was a red-brown colored oil containing no free hydroxyl groups (by I.R. analysis) and had an acid No. of 0.3 mg. KOH/g.

| | |
|---|---|
| Viscosity at 100° F. cs | 20 |
| Viscosity at 210° F. cs | 4.37 |
| ASTM slope | 0.70 |
| Pour point ° F | −80 |
| 13,000 cs. temp. ° F | −55 |

EXAMPLE VI

Phloroglucinol (126 grams, 1.0 mole) and toluene (1500 milliliters) were charged to a flask equipped with a Dean-Stark trap reflux condenser, thermometer and stirrer. The mixture was dehydrated by being stirred and heated to reflux and any water coming off by azeotropic distillation was removed by draining the Dean-Stark trap until 100 milliliters of toluene had been removed and the trap contents were clear. The mixture was cooled at 70° C.; then cyclohexane carbonyl chloride (485 grams, 3.3 mole) was added over a period of ninety minutes while the reaction mass was being stirred and maintained at a temperature of 80–90° C. Heating was continued for six hours until no evolution of hydrogen chloride was observed and the solution was refluxing at about 110° C. The solution was cooled to about 30° C. and 80 milliliters of pyridine was added. The reaction mass was then again heated to 110° C. and the temperature then maintained at reflux for another two hours to assure completeness of the esterification. The reaction mas was cooled, washed successively with dilute solutions of hydrogen chloride and of sodium hydroxide and, finally, with distilled water until the wash water was neutral to pH indicator paper. The toluene was removed from the reaction mass by distillation. Then the distillation was continued under vacuum until the temperature of the residue reached a temperature of 200° C. at the subatmospheric pressure of 0.5 to 1.0 millimeter of mercury.

The phloroglucinol tricyclohexanecarboxylate obtained as the residue (321 g. 70% yield) was a brownish colored oil containing no free hydroxy groups (by I.R. examination) and had an acid No. of 0.1 mg. KOH/g. It also had:

| | |
|---|---|
| Viscosity at 100° F. cs | 2100 |
| Viscosity at 210° F. cs | 75 |
| ASTM slope | 0.63 |
| Pour point ° F | 32 |

EXAMPLE VII

The general procedure of Example III was repeated except that there was substituted (a) 2-ethylbutanol chloride (135 grams, 1.0 mole) for the neotridecanoyl chloride of Example III, (b) 2-ethylhexanoyl chloride (163 grams, 1.0 mole) for the eicosanoyl chloride of Example III and (c) propionyl chloride (102 grams, 1.1 mole) for the acetyl chloride of Example III.

The propionate-2-ethylbutanoate-2-ethylhexanoate of hydroxyhydroquinone obtained as the residue (338 grams, 83% yield) was a clear brown oil containing no free hydroxyl groups (by infrared analysis) which had an acid No. of less than 0.1 mg. KOH/g. It also had:

| | |
|---|---|
| Viscosity at 100° F. cs | 75 |
| Viscosity at 210° F. cs | 9.28 |
| ASTM slope | 0.70 |
| Pour point ° F | −50 |
| 13,000 cs. temp. ° F | −10 |

EXAMPLE VIII

The general procedure of Example III was followed except that there was substituted (a) cyclohexanecarbonyl chloride (147 grams, 1.0 mole) for the neotridecanoyl chloride of Example III, (b) neoheptanoyl chloride (149 grams, 1.0 mole) for the eiscosanoyl chloride of Example III, and (c) propionyl chloride (102 grams, 1.1 mole) for the acetyl chloride of Example III.

The propionate-neoheptanoate-cyclohexanecarboxylate of hydroxyhydroquinone obtained as the residue was a yellow oil containing no free hydroxyl groups (by I.R. analysis) and had an acid No. of 0.2 mg. KOH/g. It also had:

| | |
|---|---|
| Viscosity at 100° F. | 30.7 |
| Viscosity at 210° F. | 4.45 |
| ASTM slope | 0.83 |
| Pour point ° F | −40 |
| 13,000 cs. temp. ° F | −20 |

EXAMPLE IX

The hydrolytic stabilities of these esters were measured by a severe saponification test under which conditions di(2-ethylhexyl) sebacate and di(isooctyl)azelate, components of some commercial synthetic lubricants, are completely hydrolyzed. The data in the table below illustrate the superior hydrolytic stabilities which the trialkanoates of the trihydroxybenzenes have over the standard aliphatic dibasic acid esters.

| Ester | Sap. No. (mg. KOH/g.) | | Percent Hydrolysis |
|---|---|---|---|
| | Found | Theory | |
| Phloroglucinol tri-n-heptanoate | 455 | 728 | 62 |
| Pyrogallol tri-n-heptanoate | 650 | 728 | 89 |
| Pyrogallol trineoheptanoate | 463 | 728 | 63 |
| Hydroxyhydroquinone trineoheptanoate | 597 | 728 | 82 |

$$\text{Percent hydrolysis} = 100 \times \frac{\text{Saponification number (found)}}{\text{Saponification number (theoretical)}}$$

EXAMPLE X

Wear characteristic tests of the esters of trihydroxybenzenes were conducted in the Shell four-ball wear tester. Test conditions were: Test time of 1 hour; test temperature at 167° F.; test speed at 620 r.p.m. and bearings of 52–100 steel. The results are illustrated below:

| Test Fluid | Average Wear Scar Diameter, mm. | | |
|---|---|---|---|
| | 1 kg. | 10 kg. | 40 kg. |
| Phloroglucinol Triheptanoate | 0.24 | 0.29 | 0.75 |
| Pyrogallol Triheptanoate | 0.30 | 0.37 | 0.80 |
| Phloroglucinol Trineoheptanoate | 0.21 | 0.25 | 0.70 |
| Pyrogallo Trineoheptanoate | 0.22 | 0.33 | 0.90 |
| Hydroxyhydroquinone Trineoheptanoate | 0.17 | 0.22 | 0.77 |
| Phloroglucinol Trilaurate | 0.20 | 0.29 | 0.92 |
| Phloroglucinol Trineotridecanoate | 0.22 | 0.41 | 0.65 |
| Di(2-ethylhexyl) Sebacate [1] | 0.43 | 0.56 | 0.80 |

[1] A standard ester lubricant.

I claim:
1. Phloroglucinol triheptanoate.
2. Phloroglucinol trilaurate.
3. Phloroglucinol trineoheptanoate.
4. Phloroglucinol trineotridecanoate.
5. Pyrogallol triheptanoate.
6. Pyrogallol trineoheptanoate.

7. Hydroxyhydroquinone trineoheptanoate.
8. Pyrogallol acetate-hexanoate-neoheptanoate.
9. Acetate-eicosanoate-neotridecanoate of hydroxyhydroquinone.
10. Acetate-butyrate-laurate of phloroglucinol.
11. Phloroglucinol tricyclohexanecarboxylate.
12. Propionate - 2 - ethylbutanoate-2-ethylhexanoate of hydroxyhydroquinone.
13. Propionate - neoheptanoate-cyclohexanecarboxylate of hydroxyhydroquinone.

References Cited

David et al.: Bull. Soc. Chim. France (1953) vol. 20, pp. 183–84.

HENRY R. JILES, *Primary Examiner.*